(12) United States Patent
Pei et al.

(10) Patent No.: US 11,050,070 B2
(45) Date of Patent: Jun. 29, 2021

(54) METHOD AND APPARATUS FOR CONTROLLING WATER FLOODING FAILURE IN FUEL CELL DUAL-STACK SYSTEM

(71) Applicant: Tsinghua University, Beijing (CN)

(72) Inventors: Pucheng Pei, Beijing (CN); Peng Ren, Beijing (CN); Yuehua Li, Beijing (CN); Ziyao Wu, Beijing (CN); Dongfang Chen, Beijing (CN); Shangwei Huang, Beijing (CN); Xiaoning Jia, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 164 days.

(21) Appl. No.: 16/244,311

(22) Filed: Jan. 10, 2019

(65) Prior Publication Data
US 2019/0229355 A1 Jul. 25, 2019

(30) Foreign Application Priority Data

Jan. 22, 2018 (CN) .......................... 201810059712.9

(51) Int. Cl.
| | |
|---|---|
| *H01M 8/00* | (2016.01) |
| *H01M 8/04089* | (2016.01) |
| *H01M 8/0267* | (2016.01) |
| *H01M 8/0258* | (2016.01) |
| *H01M 8/22* | (2006.01) |

(Continued)

(52) U.S. Cl.
CPC ..... *H01M 8/04104* (2013.01); *H01M 8/0258* (2013.01); *H01M 8/0267* (2013.01); *H01M 8/0432* (2013.01); *H01M 8/0438* (2013.01); *H01M 8/04432* (2013.01); *H01M 8/04544* (2013.01); *H01M 8/04559* (2013.01); *H01M 8/04574* (2013.01); *H01M 8/04589* (2013.01); *H01M 8/04679* (2013.01); *H01M 8/04768* (2013.01); *H01M 8/22* (2013.01); *H01M 8/24* (2013.01); *H01M 2008/1095* (2013.01)

(58) Field of Classification Search
CPC .. H01M 8/04768; H01M 8/24; H01M 8/0432; H01M 2008/1095; H01M 8/0267; H01M 8/04544
See application file for complete search history.

(56) References Cited

U.S. PATENT DOCUMENTS

2006/0073363 A1* 4/2006 Taniguchi ......... H01M 8/04097
429/429

* cited by examiner

*Primary Examiner* — Cynthia H Kelly
*Assistant Examiner* — Monique M Wills
(74) *Attorney, Agent, or Firm* — Hodgson Russ LLP

(57) ABSTRACT

Provided are a method and an apparatus controlling a water flooding failure in a fuel cell dual-stack system. The method includes: acquiring a hydrogen pressure drop reference value of the stack system in each normal working condition to obtain a control value; collecting a current pressure drop at a hydrogen side, and determining whether the current pressure drop at the hydrogen side is higher than the control value corresponding to a current normal working condition; determining a faulted stack according to voltages or currents of the first stack and the second stack if the current pressure drop at the hydrogen side is higher than the control value corresponding to the current normal working condition; reducing an opening degree of a flow regulating valve of the faulted stack, and increasing an opening degree of a flow regulating valve of the other stack.

15 Claims, 4 Drawing Sheets

(51) Int. Cl.
*H01M 8/0438* (2016.01)
*H01M 8/04537* (2016.01)
*H01M 8/0432* (2016.01)
*H01M 8/04746* (2016.01)
*H01M 8/24* (2016.01)
*H01M 8/04664* (2016.01)
*H01M 8/1018* (2016.01)

METHOD AND APPARATUS FOR CONTROLLING WATER FLOODING FAILURE IN FUEL CELL DUAL-STACK SYSTEM

CROSS-REFERENCE TO RELATED APPLICATION

This application claims priority to Chinese Patent Application Serial No. 201810059712.9, filed with the State Intellectual Property Office of P. R. China on Jan. 22, 2018, the entire disclosure of which is incorporated herein by reference.

FIELD

The present disclosure relates to a field of proton exchange membrane fuel cells, and more particularly to a method and an apparatus for controlling water failures in fuel cell dual-stack system.

BACKGROUND

The proton exchange membrane fuel cell is ideal for vehicle use due to its high efficiency and zero emission. Recently, in order to meet the requirements for applying the fuel cell system, output power and efficiency of the fuel cell system is increasingly demanding. A large-scale single stack is disassembled into two stacks or more stacks, resulting in better stack modularization design and de-rated parameter operation, and thus the reliability of the fuel cell may be improved.

Fuel cell stacks may be coupled in different manner. With respect to gas path connections, two stacks can be supplied with gas in parallel or in series. However, there is a higher flow path pressure drop if the gas is supplied in series. On this basis, the air compressor consumes more power, resulting in a greater parasitic power. Preferably, the two stacks are supplied with gas in parallel, so as to ensure the net output of the system and improve the efficiency of the system. With respect to electric connections, the two stacks can be connected in series or in parallel through cables. Appropriate power devices must be selected and appropriate circuit design must be performed to ensure that the dual stacks cooperatively output electrical energy.

A prominent problem of the fuel cell operation is the water failure, and proper water management is necessary, which is directly related to the reliability and service life of the stack system. Water failure diagnosis and prevention are of vital importance for a high-power fuel cell system with a dual-stack configuration. At present, the cell voltage monitoring (CVM) technology is widely used in the fuel cell failure diagnosis. With the CVM, voltage of each fuel cell is collected separately to determine its working state, and the voltages may be compared to each other to diagnoses the failure. The CVM can also be combined with an impedance measurement to evaluate the working state of the fuel cell, for example, combined with the low-frequency impedance to evaluate the water flooding situation. However, in such a case, the failure diagnosis result can only be obtained when the water failure seriously happens. It cannot be used for warning according to a tendency that the water failure occurs, and thus corresponding measures to avoid the water failure cannot be applied. When the water failure is determined by the CVM, the only measure is to stop the machine to avoid further deterioration. In addition, the CVM needs to detect the voltage of each battery cell, which leads out too many wires and results in manage difficulties, thus significantly reducing the reliability of the system. For the dual-stack fuel cell system, the system power is generally large, and the number of cells is generally large. Although the CVM technology can be applied in the system, the problem introduced by the application of the CVM technology is prominent.

In order to solve the problem of the late diagnosis in the CVM technology, hydrogen pressure drop is used to evaluate water state of the fuel cell, such that a tendency of water flooding may be detected before it really happens and measures may be taken to avoid the water flooding failure in time. In addition, the large number of wires used in the CVM may also be reduced. However, above method is limited in applications of dual-stack system and multi-stack system. The main reason is that for example under the dual-stack parallel gas supply mechanism, the water flooding of one of the two stacks will cause the change of the gas distribution of the two stacks, that is, the gas flow of the flooded stack is reduced, and the gas flow of the un-flooded stack is increased, which will weaken the variation tendency of the pressure drop, and thus the pressure drop cannot be used as the only parameter to identify the water state.

SUMMARY

Embodiments of the present disclosure seek to solve at least one of the problems existing in the related art to at least some extent.

Accordingly, embodiments of a first aspect of the present disclosure provide a method for controlling a water flooding failure in a fuel cell dual-stack system. The fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the method includes:

acquiring a hydrogen pressure drop reference value of the stack system in each normal working condition to obtain a control value;

collecting a current pressure drop at a hydrogen side, and determining whether the current pressure drop at the hydrogen side is higher than the control value corresponding to a current normal working condition;

determining a faulted stack according to voltages or currents of the first stack and the second stack if the current pressure drop at the hydrogen side is higher than the control value corresponding to the current normal working condition;

reducing an opening degree of a flow regulating valve of the faulted stack, and increasing an opening degree of a flow regulating valve of the other stack.

Embodiments of a second aspect of the present disclosure provide an apparatus for controlling a water flooding failure in a fuel cell dual-stack system, in which the fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the apparatus includes: one or more processors; a memory; one or more software modules stored in the memory and executable by the one or more processors, and including:

an acquiring module configured to acquire a hydrogen pressure drop reference value of the stack system in each normal working condition to obtain a control value;

a collecting and determining module configured to collect a current pressure drop at a hydrogen side, and determine whether the current pressure drop at the hydrogen side is higher than the control value corresponding to a current normal working condition;

a faulty determining module configured to determine a faulted stack according to voltages or currents of the first stack and the second stack if the current pressure drop at the hydrogen side is higher than the control value corresponding to the current normal working condition;

a processing module configured to reduce an opening degree of a flow regulating valve of the faulted stack, and increase an opening degree of a flow regulating valve of the other stack.

Embodiments of a third aspect of the present disclosure provide a computer-readable storage medium having stored therein computer programs that, when executed by a processor of a terminal, causes the terminal to perform a method for controlling a water flooding failure in a fuel cell dual-stack system, in which the fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the method includes:

acquiring a hydrogen pressure drop reference value of the stack system in each normal working condition to obtain a control value;

collecting a current pressure drop at a hydrogen side, and determining whether the current pressure drop at the hydrogen side is higher than the control value corresponding to a current normal working condition;

determining a faulted stack according to voltages or currents of the first stack and the second stack if the current pressure drop at the hydrogen side is higher than the control value corresponding to the current normal working condition;

reducing an opening degree of a flow regulating valve of the faulted stack, and increasing an opening degree of a flow regulating valve of the other stack.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
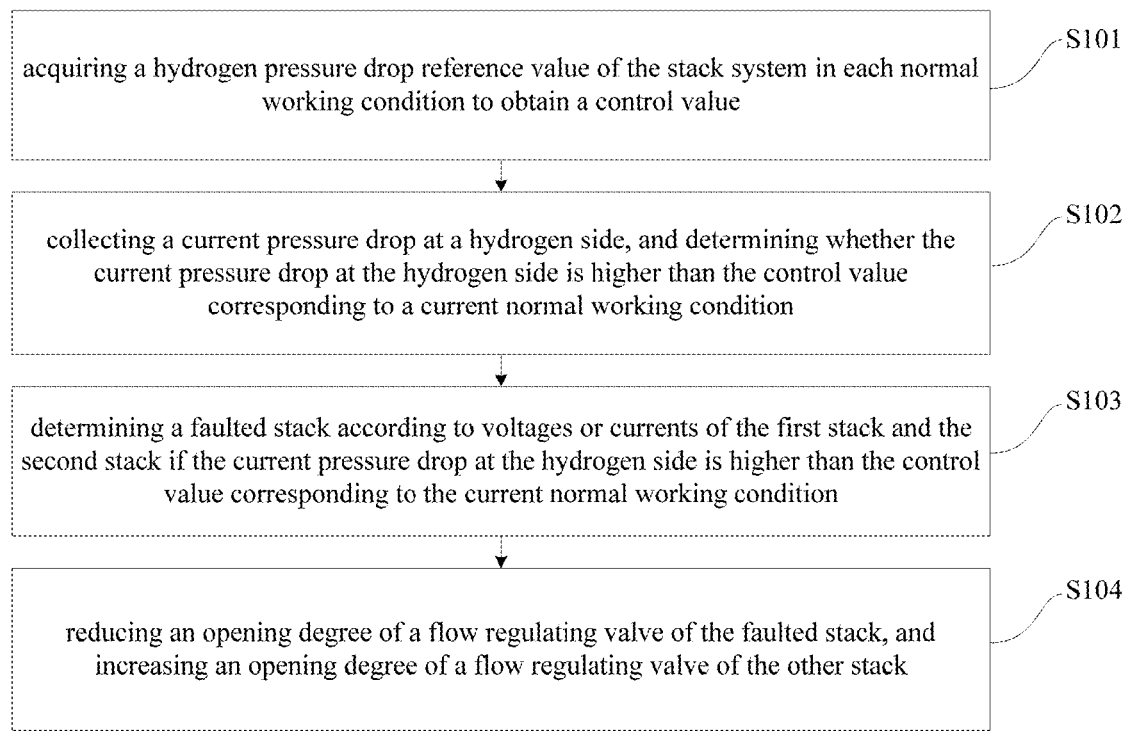
FIG. 1 is a flow chart of a method for controlling a water flooding failure in a fuel cell dual-stack system according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, and used to generally understand the present disclosure. The embodiments shall not be construed to limit the present disclosure.

In embodiments of the present disclosure, a method for controlling a water flooding failure in a fuel cell dual-stack system is provided. With such a method, an early warning may be effectively provided for the water flooding failure of the fuel cell dual-stack system and the stack having the water flooding tendency may be found, such that corresponding measures may be taken to avoid the failure.

Specifically, the fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the method includes:

acquiring a hydrogen pressure drop reference value of the stack system in each normal working condition to obtain a control value;

collecting a current pressure drop at a hydrogen side, and determining whether the current pressure drop at the hydrogen side is higher than the control value corresponding to a current normal working condition;

determining a faulted stack according to voltages or currents of the first stack and the second stack if the current pressure drop at the hydrogen side is higher than the control value corresponding to the current normal working condition;

reducing an opening degree of a flow regulating valve of the faulted stack, and increasing an opening degree of a flow regulating valve of the other stack.

With above process according to the method for controlling a water flooding failure in a fuel cell dual-stack system according to embodiments of the present disclosure, the pressure drop may be used in the pre-diagnosis module to warn that there is a tendency that the water flooding may occur, such that there will be time for a person to take measures to avoid the failure. With such a method, unlike the CVM method, an amount of the data needed to be collected is relatively small and the number of wires needed is less, and thus an early warning may be effectively provided for the water flooding failure of the fuel cell dual-stack system and the stack having the water flooding tendency may be found, such that corresponding measures may be taken to avoid the failure.

In an embodiment of the present disclosure, determining a faulted stack according to voltages or currents of the first stack and the second stack if the current pressure drop at the hydrogen side is higher than the control value corresponding to the current normal working condition includes:

when the first stack and the second stack are coupled in series, determining that the first stack has a water flooding tendency and is the faulted stack if a voltage of the first stack is decreased and a voltage of the second stack is increased, or determining that the second stack has a water flooding tendency and is the faulted stack if the voltage of the first stack is increased and the voltage of the second stack voltage is decreased, or when the first stack and the second stack are coupled in parallel, determining that the first stack has a water flooding tendency and is the faulted stack if a current of the first stack is decreased and a current of the second stack is increased, or determining that the second stack has a water flooding tendency and is the faulted stack if the current of the first stack is increased and the current of the second stack is decreased.

In an embodiment of the present disclosure, reducing an opening degree of a flow regulating valve of the faulted stack, and increasing an opening degree of a flow regulating valve of the other stack includes:

controlling an opening degree of the first flow regulating valve to decrease and an opening degree of the second flow regulating valve to increase if the first stack has a water flooding tendency, controlling the opening degree of the first flow regulating valve to increase and the opening degree of the second flow regulating valve to decrease if the second stack has a water flooding tendency.

In an embodiment of the present disclosure, the method may further includes restoring the opening degrees of the first flow regulating valve and the second flow regulating valve and keeping monitoring continuously if the current pressure drop at the hydrogen side returns to below the control value corresponding to the current normal working condition.

In an embodiment of the present disclosure, the pressure drop at the hydrogen side is calculated by a formula of $$\Delta P_{H_2\_theory} = \begin{cases} \dfrac{6.32 \times 10^{-11}(C_w + C_d)^2 LT^{1.6835}}{n(C_w \cdot C_d)^3(p - p_{sat})}(\lambda_{H_2} - 0.5)I & (273K \leq T \leq 313K) \\ \dfrac{1.1748 \times 10^{-9}(C_w + C_d)^2 Le^{T/275.7}T}{n(C_w \cdot C_d)^3(p - p_{sat})p^{0.0263}}(\lambda_{H_2} - 0.5)I & (313K < T \leq 373K) \end{cases},$$

where L is a channel length, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell;

the control value of the hydrogen pressure drop is determined by a formula of $$\Delta P_{control} = \Delta P_{H_2\_theory} + \frac{1}{2}\Delta P_{ladder},$$

in which the hydrogen pressure drop varies in the water flooding process as a two-step variation, and $\Delta P_{ladder}$ is determined as a difference in pressure drops between the two steps.

In embodiments of the present disclosure, an apparatus for controlling a water flooding failure in a fuel cell dual-stack system is provided, in which the fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the apparatus includes: one or more processors; a memory; one or more software modules stored in the memory and executable by the one or more processors, and including:

an acquiring module configured to acquire a hydrogen pressure drop reference value of the stack system in each normal working condition to obtain a control value;

a collecting and determining module configured to collect a current pressure drop at a hydrogen side, and determine whether the current pressure drop at the hydrogen side is higher than the control value corresponding to a current normal working condition;

a faulty determining module configured to determine a faulted stack according to voltages or currents of the first stack and the second stack if the current pressure drop at the hydrogen side is higher than the control value corresponding to the current normal working condition;

a processing module configured to reduce an opening degree of a flow regulating valve of the faulted stack, and increase an opening degree of a flow regulating valve of the other stack.

With above process according to the apparatus for controlling a water flooding failure in a fuel cell dual-stack system according to embodiments of the present disclosure, the pressure drop may be used in the pre-diagnosis module to warn that there is a tendency that the water flooding may occur, such that there will be time for a person to take measures to avoid the failure. With such a method, unlike the CVM method, an amount of the data needed to be collected is relatively small and the number of wires needed is less, and thus an early warning may be effectively provided for the water flooding failure of the fuel cell dual-stack system and the stack having the water flooding tendency may be found, such that corresponding measures may be taken to avoid the failure.

In an embodiment of the present disclosure, the faulty determining module is specifically configured to:

when the first stack and the second stack are coupled in series, determine that the first stack has a water flooding tendency and is the faulted stack if a voltage of the first stack is decreased and a voltage of the second stack is increased, or determine that the second stack has a water flooding tendency and is the faulted stack if the voltage of the first stack is increased and the voltage of the second stack voltage is decreased, or when the first stack and the second stack are coupled in parallel, determine that the first stack has a water flooding tendency and is the faulted stack if a current of the first stack is decreased and a current of the second stack is increased, or determine that the second stack has a water flooding tendency and is the faulted stack if the current of the first stack is increased and the current of the second stack is decreased.

In an embodiment of the present disclosure, the processing module is specifically configured to:

control an opening degree of the first flow regulating valve to decrease and an opening degree of the second flow regulating valve to increase if the first stack has a water flooding tendency, control the opening degree of the first flow regulating valve to increase and the opening degree of the second flow regulating valve to decrease if the second stack has a water flooding tendency.

In an embodiment of the present disclosure, the one or more software modules further include a restoring module configured to restore the opening degrees of the first flow regulating valve and the second flow regulating valve and keep monitoring continuously if the current pressure drop at the hydrogen side returns to below the control value corresponding to the current normal working condition.

In an embodiment of the present disclosure, the pressure drop at the hydrogen side is calculated by a formula of $$\Delta P_{H_2\_theory} =$$

$$\begin{cases} \dfrac{6.32 \times 10^{-11}(C_w + C_d)^2 L T^{1.6835}}{n(C_w \cdot C_d)^3 (p - p_{sat})}(\lambda_{H_2} - 0.5)I & (273K \leq T \leq 313K) \\ \dfrac{1.1748 \times 10^{-9}(C_w + C_d)^2 L e^{T/275.7} T}{n(C_w \cdot C_d)^3 (p - p_{sat}) p^{0.0263}}(\lambda_{H_2} - 0.5)I & (313K \leq T \leq 373K) \end{cases},$$

where L is a channel length, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell;

the control value of the hydrogen pressure drop is determined by a formula of $$\Delta P_{control} = \Delta P_{H_2\_theory} + \frac{1}{2}\Delta P_{ladder},$$

in which the hydrogen pressure drop varies in the water flooding process as a two-step variation, and $\Delta P_{ladder}$ is determined as a difference in pressure drop between the two steps.

FIG. 1 is a flow chart of a method for controlling a water flooding failure in a fuel cell dual-stack system according to an embodiment of the present disclosure.

With reference to FIG. 1, the fuel cell dual-stack system includes a first stack and a second stack energized in parallel or in series, and a first flow regulating valve is disposed at a first cooling water line of the first stack and a second flow regulating valve is disposed at a second cooling water line of the second stack. The method for controlling a water flooding failure in a fuel cell dual-stack system includes following steps.

In S101, a hydrogen pressure drop reference value of the stack system in each normal working condition is acquired to obtain a control value. The hydrogen pressure drop diagnosis is used as an auxiliary means, and thus can be used to warn about the tendency of the water flooding.

Figure 2:
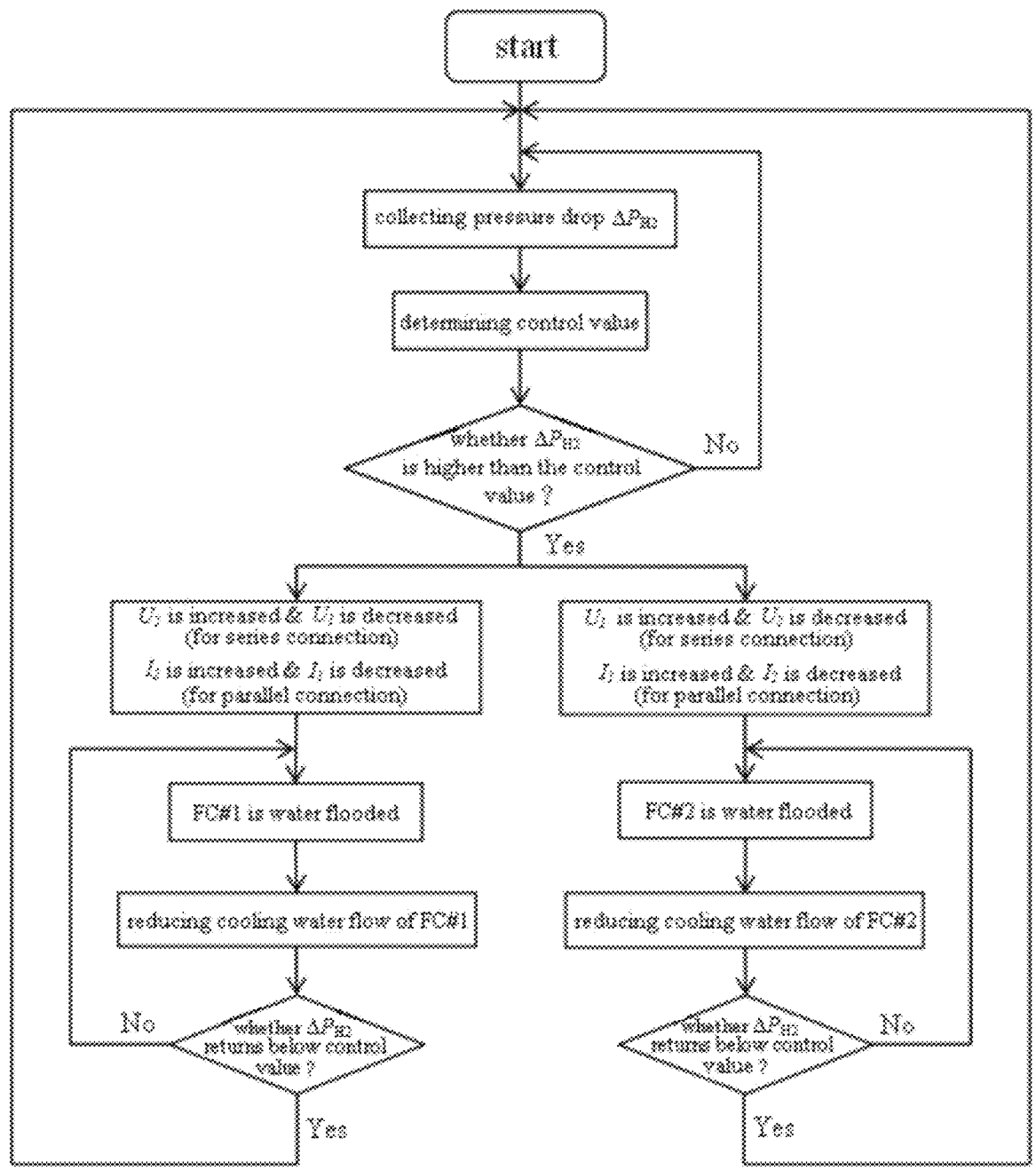
FIG. 2 is a flow chart of a method for controlling a water flooding failure in a fuel cell dual-stack system according to a specific embodiment of the present disclosure.

It should be understood that, as shown in FIG. 2, the hydrogen pressure drop reference value in each normal working condition without water flooding is calculated by a formula of the hydrogen pressure drop and the control value is determined according to the reference value.

In an embodiment of the present disclosure, the formula of the hydrogen pressure drop is $$\Delta P_{H_2\_theory} =$$

$$\begin{cases} \dfrac{6.32 \times 10^{-11}(C_w + C_d)^2 L T^{1.6835}}{n(C_w \cdot C_d)^3 (p - p_{sat})}(\lambda_{H_2} - 0.5)I & (273K \leq T \leq 313K) \\ \dfrac{1.1748 \times 10^{-9}(C_w + C_d)^2 L e^{T/275.7} T}{n(C_w \cdot C_d)^3 (p - p_{sat}) p^{0.0263}}(\lambda_{H_2} - 0.5)I & (313K < T \leq 373K) \end{cases},$$

where L is a channel length, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell.

The control value of the hydrogen pressure drop is determined by a formula of $$\Delta P_{control} = \Delta P_{H_2\_theory} + \frac{1}{2}\Delta P_{ladder},$$

in which the hydrogen pressure drop varies in the water flooding process as a two-step variation, and is determined as a difference in pressure drop between the two steps.

Specifically, it is assumed that gas is uniformly distributed to the two stacks and the working states of the two stacks are completely consistent, and the hydrogen pressure drop reference value in each normal working condition without water flooding is calculated by a formula of $$\Delta P_{H_2\_theory} =$$

$$\begin{cases} \dfrac{6.32 \times 10^{-11}(C_w + C_d)^2 L T^{1.6835}}{n(C_w \cdot C_d)^3 (p - p_{sat})}(\lambda_{H_2} - 0.5)I & (273K \leq T \leq 313K) \\ \dfrac{1.1748 \times 10^{-9}(C_w + C_d)^2 L e^{T/275.7} T}{n(C_w \cdot C_d)^3 (p - p_{sat}) p^{0.0263}}(\lambda_{H_2} - 0.5)I & (313K < T \leq 373K) \end{cases},$$

where L is a channel length, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell.

The control value of the hydrogen pressure drop is determined by a formula of $$\Delta P_{control} = \Delta P_{H_2\_theory} + \frac{1}{2}\Delta P_{ladder},$$

in which the hydrogen pressure drop varies in the water flooding process as a two-step variation, and $\Delta P_{ladder}$ is determined as a difference in pressure drops between the two steps.

In S102, a current pressure drop at a hydrogen side is collected, and it is determined whether the current pressure drop at the hydrogen side is higher than the control value corresponding to a current normal working condition.

It should be understood that, as shown in FIG. 2, the pressure drop at the hydrogen side $\Delta P_{H2}$ is collected. When $\Delta P_{H2}$ is lower than the control value, monitoring is kept continuously. When $\Delta P_{H2}$ is higher than the control value, it is determined that there is a tendency of water flooding and there comes a further judgement.

In S103, a faulted stack is determined according to voltages or currents of the first stack and the second stack if the current pressure drop at the hydrogen side is higher than the control value corresponding to the current normal working condition.

It should be understood that with a general principle of the gas distribution of the parallel gas supply of the two stacks, the stack having the water flooding tendency will have an increased the gas flow resistance and a reduced gas amount, and the normally working stack thus has an increased the gas amount distributed. In other words, the output performance of the faulted stack is deteriorated and the output performance of the normally working stack is improved. On this basis, the faulted stack may be determined according to currents (when stacks are coupled in parallel) or voltages (when stacks are coupled in series) of the two stacks.

Further, in an embodiment of the present disclosure, the first stack and the second stack are coupled in series. When a voltage of the first stack is decreased, a voltage of the second stack is increased, such that the first stack has a water flooding tendency and is the faulted stack. When the voltage of the first stack is increased, the voltage of the second stack voltage is decreased, such that the second stack has a water flooding tendency and is the faulted stack. In another embodiment of the present disclosure, the first stack and the second stack are coupled in parallel. When a current of the first stack is decreased, a current of the second stack is increased, such that the first stack has a water flooding tendency and is the faulted stack. When the current of the first stack is increased, the current of the second stack is decreased, such that the second stack has a water flooding tendency and is the faulted stack.

Specifically, in the case that the two stacks are coupled in series, if the voltage $U_2$ of the second stack is increased, the voltage $U_1$ of the first stack is decreased (or in the case that the two stacks are coupled in parallel, if the current $I_2$ of the second stack is increased, the current $I_1$ of the first stack is decreased), it is determined that the first stack has the water flooding tendency and is the faulted stack. If the voltage $U_1$ of the first stack is increased and the voltage $U_2$ of the second stack is decreased (or the two stacks are coupled in parallel, if the current $I_1$ of the first stack is increased, the current $I_2$ of the second stack is decreased), it is determined that the second stack has the water flooding tendency and is the faulted stack.

In S104, an opening degree of a flow regulating valve of the faulted stack is reduced, and an opening degree of a flow regulating valve of the other stack is increased.

It should be understood that in the method according to the present disclosure, opening degrees of the first and the second flow regulating valves are adjusted to restrain the tendency of the water flooding and avoid the water failure.

Further, in an embodiment of the present disclosure, reducing an opening degree of a flow regulating valve of the faulted stack and increasing an opening degree of a flow regulating valve of the other stack includes: controlling an opening degree of the first flow regulating valve to decrease and an opening degree of the second flow regulating valve to increase if the first stack has a water flooding tendency, and controlling the opening degree of the first flow regulating valve to increase and the opening degree of the second flow regulating valve to decrease if the second stack has a water flooding tendency.

Specifically, the opening degrees of the flow regulating valves disposed on the cooling lines of the two stacks are adjusted to control the opening degree of the faulted stack to decrease and increase the temperature, thus avoiding the water flooding failure. More specifically, it is controlled that the opening degree of the first flow regulating valve is decreased and the opening degree of the second flow regulating valve is increased if the first stack has the water flooding tendency, and the opening degree of the first flow regulating valve is increased and the opening degree of the second flow regulating valve is decreased if the second stack has the water flooding tendency.

In an embodiment of the present disclosure, the method further includes: restoring the opening degrees of the first flow regulating valve and the second flow regulating valve and keeping monitoring continuously if the current pressure drop at the hydrogen side returns to below the control value corresponding to the current normal working condition.

It should be understood that in the method of the present disclosure, if it is determined that the pressure drop at the hydrogen side $\Delta P_{H2}$ returns to below the control value, the opening degrees of the first flow regulating valve and the second flow regulating valve can be restored and monitoring may be kept continuously.

In addition, the gas pressure drop monitored by the method according to the embodiments of the present disclosure can be extended to a cathode gas pressure drop, and it can be applied to a hydrogen-oxygen fuel cell dual-stack system, and also can be extended to a multi-stack system.

In summary, the embodiments of the present disclosure are based on the following rule. In the system where two stacks are coupled in parallel, when one stack has the tendency of water flooding, a difference may be generated between the gas flow resistances of the two stacks and thus the gas distribution of the two stacks changes. Specifically, the gas flow resistance of the faulted stack is increased, the gas flow is decreased, and thus normally working stack has an increased gas flow. However the change of the gas distribution will weaken the change trend of the hydrogen pressure drop, the increase ratio of the hydrogen pressure drop is lower than that of the single stack system, such that the pressure drop diagnosis is only used as an auxiliary means of the present method. The stack is sensitive to the gas flow, and the change of the gas distribution will make the output performance of the faulted stack worse and the output performance of the normal stack becomes better. On this basis, the faulted stack can thus be determined by detection of voltages (when the two stacks are coupled in series) or currents (when the two stacks are coupled in parallel) of the stacks.

With the diagnosis and circumvention applied according to the present method, the pressure drop may be used in the pre-diagnosis module to warn that there is a tendency that the water flooding may occur, such that there will be time for a person to take measures to avoid the failure. With such a method, unlike the CVM method, an amount of the data needed to be collected is relatively small and the number of wires needed is less. It can be applied to the hydrogen-oxygen fuel cell dual-stack system, which can be extended to multi-stack systems, meeting the requirements of disassembling a high-power fuel cell single stack system into multiple stacks, thus effectively improving the system reliability.

Following is the description of an apparatus for controlling a water flooding failure in a fuel cell dual-stack system according to an embodiment of the present disclosure with reference to the accompanying drawings.

Figure 3:
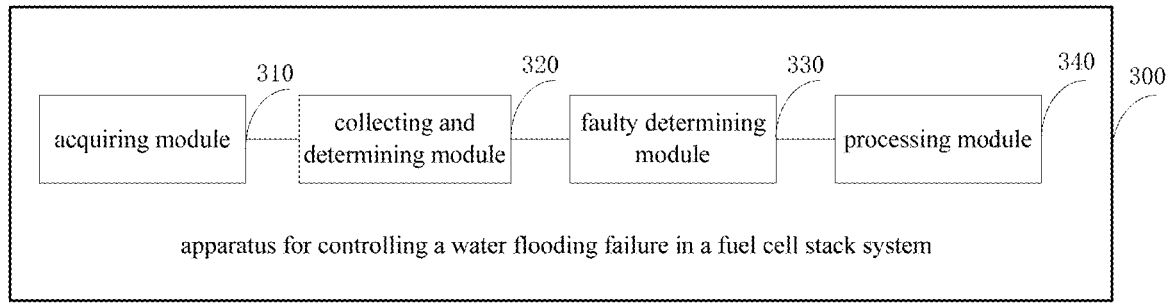
FIG. 3 is a block diagram of an apparatus for controlling a water flooding failure in a fuel cell dual-stack system according to an embodiment of the present disclosure.

FIG. 3 is a block diagram of an apparatus for controlling a water flooding failure in a fuel cell dual-stack system according to an embodiment of the present disclosure.

As shown in FIG. 3, the fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the apparatus 300 includes one or more processors, a memory, one or more software modules stored in the memory and executable by the one or more processors, and including an acquiring module 310, a collecting and determining module 320, a faulty determining module 330 and a processing module 340.

Specifically, the acquiring module 310 is configured to acquire a hydrogen pressure drop reference value of the stack system in each normal working condition to obtain a control value; the collecting and determining module 320 is configured to collect a current pressure drop at a hydrogen side, and determine whether the current pressure drop at the hydrogen side is higher than the control value corresponding to a current normal working condition; the faulty determining module 330 is configured to determine a faulted stack according to voltages or currents of the first stack and the second stack if the current pressure drop at the hydrogen side is higher than the control value corresponding to the current normal working condition; the processing module 340 is configured to reduce an opening degree of a flow regulating valve of the faulted stack, and increase an opening degree of a flow regulating valve of the other stack. With the apparatus 300 according to the embodiment of the present disclosure, an early warning may be effectively provided for the water flooding failure of the fuel cell dual-stack system and the stack having the water flooding tendency may be found, such that corresponding measures may be taken to avoid the failure, and thus improving the system reliability.

Further, in an embodiment of the present disclosure, the faulty determining module is specifically configured to: when the first stack and the second stack are coupled in series, determine that the first stack has a water flooding tendency and is the faulted stack if a voltage of the first stack is decreased and a voltage of the second stack is increased, or determine that the second stack has a water flooding tendency and is the faulted stack if the voltage of the first stack is increased and the voltage of the second stack voltage is decreased, or when the first stack and the second stack are coupled in parallel, determine that the first stack has a water flooding tendency and is the faulted stack if a current of the first stack is decreased and a current of the second stack is increased, or determine that the second stack has a water flooding tendency and is the faulted stack if the current of the first stack is increased and the current of the second stack is decreased.

Further, in an embodiment of the present disclosure, the processing module is specifically configured to: control an opening degree of the first flow regulating valve to decrease and an opening degree of the second flow regulating valve to increase if the first stack has a water flooding tendency, and control the opening degree of the first flow regulating valve to increase and the opening degree of the second flow regulating valve to decrease if the second stack has a water flooding tendency.

Further, in an embodiment of the present disclosure, the one or more software modules further include a restoring module configured to restore the opening degrees of the first flow regulating valve and the second flow regulating valve and keep monitoring continuously if the current pressure drop at the hydrogen side returns to below the control value corresponding to the current normal working condition.

In an embodiment of the present disclosure, the formula of the hydrogen pressure drop is $$\Delta P_{H_2\_theory} =$$

$$\begin{cases} \dfrac{6.32 \times 10^{-11}(C_w + C_d)^2 L T^{1.6835}}{n(C_w \cdot C_d)^3(p - p_{sat})}(\lambda_{H_2} - 0.5)I & (273K \leq T \leq 313K) \\ \dfrac{1.1748 \times 10^{-9}(C_w + C_d)^2 L e^{T/275.7} T}{n(C_w \cdot C_d)^3(p - p_{sat})p^{0.0263}}(\lambda_{H_2} - 0.5)I & (313K < T \leq 373K) \end{cases},$$

where L is a channel length, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell.

The control value of the hydrogen pressure drop is determined by a formula of $$\Delta P_{control} = \Delta P_{H_2\_theory} + \frac{1}{2}\Delta P_{ladder},$$

in which the hydrogen pressure drop varies in the water flooding process as a two-step variation, and is determined as a difference in pressure drop between the two steps.

Figure 4:
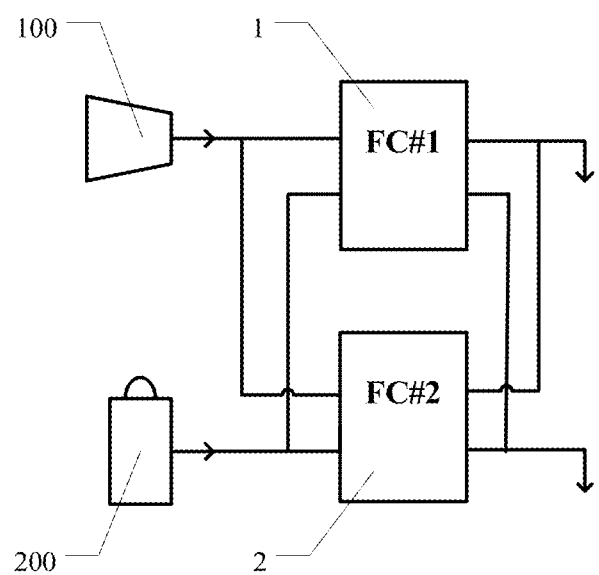
FIG. 4 is a schematic diagram showing a gas connection of a fuel cell dual-stack system according to an embodiment of the present disclosure.
Figure 5:
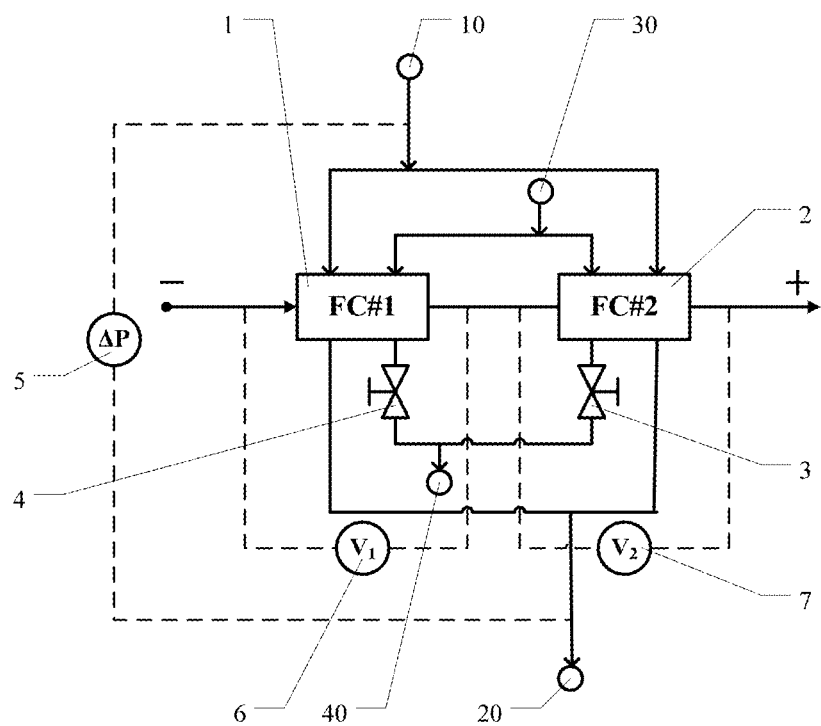
FIG. 5 is a schematic diagram showing a gas/electricity/water connection of a fuel cell dual-stack system having two stacks coupled in series according to an embodiment of the present disclosure.

In a specific embodiment of the present disclosure, as shown in FIGS. 4 and 5, gas is uniformly distributed to the two stacks and the working states of the two stacks are completely consistent. The air is supplied in parallel, that is, the air is supplied to the first stack 1 and the second stack 2 through the air compressor 100. The hydrogen is supplied in parallel, that is, the hydrogen is discharged from the hydrogen tank 200, transmitted to the first stack 1 and the second stack 2 through a hydrogen inlet 10 of the dual-stack system, and discharged from the system through a hydrogen outlet 20. The differential pressure sensor 5 is provided to collect the pressure difference between the hydrogen inlet and outlet of the system. The cooling water simultaneously flows into the two stacks through the cooling water inlet 30 of the system. The first flow regulating valve 4 is disposed on the first cooling water line of the first stack 1, and the second flow regulating valve 3 is disposed on the cooling water line of the second stack 2, and first flow regulating valve 4 and the second flow regulating valve 3 are configured to adjust the flow of the cooling water of the first stack 1 and the second stack 2 respectively. After that, the cooling water is discharged from the system through the cooling water outlet 40. Regarding the electricity connection, the two stacks are coupled in series. The voltmeter $V_1$ 6 is configured to collect the voltage $U_1$ of the first stack 1, and the voltmeter $V_2$ 7 is configured to collect the voltage $U_2$ of the second stack 2.

If the pressure drop between the hydrogen inlet and outlet of the system detected by the differential pressure sensor 5 exceeds the control value, the voltage values $U_1$ and $U_2$ are used to determine which one of the stacks has the water flooding tendency. If $U_1$ is decreased and $U_2$ is increased, it is determined that the first stack 1 has the water flooding tendency. The opening degree of the first flow regulating valve 4 is decreased, and the opening degree of the second flow regulating valve 3 is increased, thereby reducing the flow rate of the cooling water passing through the first stack 1. The temperature of the first stack 1 is increased, and the water flooding tendency is suppressed until the hydrogen pressure drop returns to below the control value.

Figure 6:
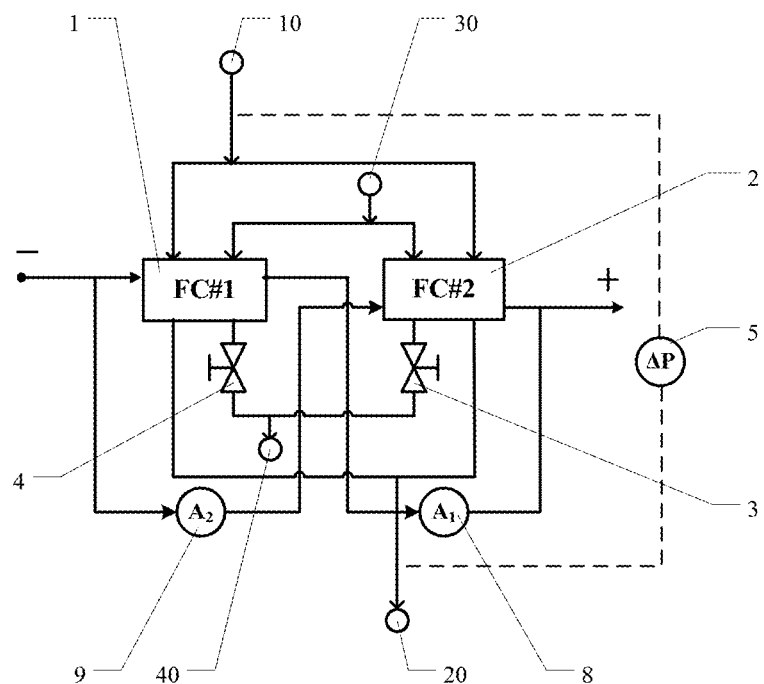
FIG. 6 is a schematic diagram showing a gas/electricity/water connection of a fuel cell dual-stack system having two stacks coupled in parallel according to an embodiment of the present disclosure.

In addition, as shown in FIG. 4 and FIG. 6, in another embodiment of the present disclosure, compared to the system described above, the dual-stack structure and components are completely identical, and the water line and the gas line connection manners are the same, and the determination of the hydrogen pressure drop control value is the same as that of the above embodiment. However, regarding the electricity connection, the two stacks are coupled in parallel. The ammeter $A_1$ 8 is configured to collect the current $I_1$ of the first stack 1, and the ammeter $A_2$ 9 is configured to collect the current $I_2$ of the second stack 2.

If the pressure drop between the hydrogen inlet and outlet of the system detected by the differential pressure sensor 5 exceeds the control value, the currents $I_1$ and $I_2$ are used to determine which one of the stacks has the water flooding tendency. If $I_1$ is decreased and $I_2$ is increased, it is determined that the first stack 1 has the water flooding tendency. The opening degree of the first flow regulating valve 4 is decreased, and the opening degree of the second flow regulating valve 3 is increased, thereby reducing the flow rate of the cooling water passing through the stack 1. The temperature of the first stack 1 is increased, and the water flooding tendency is suppressed until the hydrogen pressure drop returns to below the control value.

It should be noted that the foregoing explanations of the embodiments of the method for controlling the water flooding failure in the fuel cell dual-stack system is also applicable to the apparatus for controlling a water flooding failure in a fuel cell dual-stack system, and details are not described in detail herein for avoiding duplicates.

With the apparatus for controlling a water flooding failure in a fuel cell dual-stack system, the pressure drop may be used in the pre-diagnosis module to warn that there is a tendency that the water flooding may occur, such that there will be time for a person to take measures to avoid the failure. With such a method, unlike the CVM method, an amount of the data needed to be collected is relatively small and the number of wires needed is less. It can be applied to the hydrogen-oxygen fuel cell dual-stack system, which can be extended to multi-stack systems, meeting the requirements of disassembling a high-power fuel cell single stack system into multiple stacks, thus effectively improving the system reliability.

Embodiments of the present disclosure provide a computer-readable storage medium having stored therein computer programs that, when executed by a processor of a terminal, causes the terminal to perform a method for controlling a water flooding failure in a fuel cell dual-stack system, in which the fuel cell dual-stack system includes a first stack and a second stack energized in parallel or in series, and a first flow regulating valve is disposed at a first cooling water line of the first stack and a second flow regulating valve is disposed at a second cooling water line of the second stack, in which the method includes:

acquiring a hydrogen pressure drop reference value of the stack system in each normal working condition to obtain a control value;

collecting a current pressure drop at a hydrogen side, and determining whether the current pressure drop at the hydrogen side is higher than the control value corresponding to a current normal working condition;

determining a faulted stack according to voltages or currents of the first stack and the second stack if the current pressure drop at the hydrogen side is higher than the control value corresponding to the current normal working condition;

reducing an opening degree of a flow regulating valve of the faulted stack, and increasing an opening degree of a flow regulating valve of the other stack.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, unless specified otherwise, "a plurality of" means two or more than two.

In the present disclosure, unless specified or limited otherwise, the terms "mounted", "connected", "coupled" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on", "above" or "on top of" a second feature may include an embodiment in which the first feature is right or obliquely "on", "above" or "on top of" the second feature, or just means that the first feature is at a height higher than that of the second feature; while a first feature "below", "under" or "on bottom of" a second feature may include an embodiment in which the first feature is right or obliquely "below", "under" or "on bottom of" the second feature, or just means that the first feature is at a height lower than that of the second feature.

Reference throughout this specification to "an embodiment", "some embodiments", "a schematic embodiment", "an example", "a specific example" or "some examples" means that a particular feature, structure, material, or characteristic described in connection with the embodiment or example is included in at least one embodiment or example of the present disclosure. Thus, the appearances of the phrases such as "an embodiment", "some embodiments", "a schematic embodiment", "an example", "a specific example" or "some examples" in various places throughout this specification are not necessarily referring to the same embodiment or example of the present disclosure. Furthermore, the particular features, structures, materials, or characteristics may be combined in any suitable manner in one or more embodiments or examples.

It will be understood that, any process or method described in a flow chart or described herein in other manners may include one or more modules, segments or portions of codes that include executable instructions to implement the specified logic function(s) or that includes executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flow chart may be executed concurrently or with partial concurrence.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, the "computer readable medium" may be any device adaptive for including, storing, communicating, propagating or transferring programs to be used by or in combination with the instruction execution system, device or equipment. More specific examples of the computer readable medium include but are not limited to: an electronic connection (an IPM overcurrent protection circuit) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for controlling a water flooding failure in a fuel cell dual-stack system, wherein the fuel cell dual-stack system comprises a first stack and a second stack energized in parallel or in series, and a first flow regulating valve is disposed at a first cooling water line of the first stack and a second flow regulating valve is disposed at a second cooling water line of the second stack, wherein the method comprises:
acquiring a hydrogen pressure drop reference value of the stack system in each normal working condition to obtain a control value;
collecting a current pressure drop at a hydrogen side, and determining whether the current pressure drop at the hydrogen side is higher than the control value corresponding to a current normal working condition;
determining a faulted stack according to voltages or currents of the first stack and the second stack if the current pressure drop at the hydrogen side is higher than the control value corresponding to the current normal working condition;
reducing an opening degree of a flow regulating valve of the faulted stack, and increasing an opening degree of a flow regulating valve of the other stack.

2. The method according to claim 1, wherein determining a faulted stack according to voltages or currents of the first stack and the second stack if the current pressure drop at the hydrogen side is higher than the control value corresponding to the current normal working condition comprises:
when the first stack and the second stack are coupled in series,
determining that the first stack has a water flooding tendency and is the faulted stack if a voltage of the first stack is decreased and a voltage of the second stack is increased, or determining that the second stack has a water flooding tendency and is the faulted stack if the voltage of the first stack is increased and the voltage of the second stack voltage is decreased,
or
when the first stack and the second stack are coupled in parallel,
determining that the first stack has a water flooding tendency and is the faulted stack if a current of the first stack is decreased and a current of the second stack is increased, or determining that the second stack has a water flooding tendency and is the faulted stack if the current of the first stack is increased and the current of the second stack is decreased.

3. The method according to claim 1, wherein reducing an opening degree of a flow regulating valve of the faulted stack, and increasing an opening degree of a flow regulating valve of the other stack comprises:
controlling an opening degree of the first flow regulating valve to decrease and an opening degree of the second flow regulating valve to increase if the first stack has a water flooding tendency,
controlling the opening degree of the first flow regulating valve to increase and the opening degree of the second flow regulating valve to decrease if the second stack has a water flooding tendency.

4. The method according to claim 3, further comprising:
restoring the opening degrees of the first flow regulating valve and the second flow regulating valve and keeping monitoring continuously if the current pressure drop at the hydrogen side returns to below the control value corresponding to the current normal working condition.

5. The method according to claim 4, wherein the pressure drop at the hydrogen side is calculated by a formula of $$\Delta P_{H_2\_theory} =$$

$$\begin{cases} \dfrac{6.32\times 10^{-11}(C_w+C_d)^2 LT^{1.6835}}{n(C_w\cdot C_d)^3(p-p_{sat})}(\lambda_{H_2}-0.5)I & (273K\le T\le 313K) \\ \dfrac{1.1748\times 10^{-9}(C_w+C_d)^2 Le^{T/275.7}T}{n(C_w\cdot C_d)^3(p-p_{sat})p^{0.0263}}(\lambda_{H_2}-0.5)I & (313K<T\le 373K) \end{cases},$$

where L is a channel length, e refers to e constant n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell and I is a current of the fuel cell;

the control value of the hydrogen pressure drop is determined by a formula of $$\Delta P_{control}=\Delta P_{H_2\_theory}+\tfrac{1}{2}\Delta P_{ladder},$$

wherein the hydrogen pressure drop varies in the water flooding process as a two-step variation, and $\Delta P_{ladder}$ is determined as a difference in pressure drops between the two steps.

6. An apparatus for controlling a water flooding failure in a fuel cell dual-stack system, comprising:
one or more processors;
a memory;
one or more software modules stored in the memory and executable by the one or more processors, which when executed by the one or more processors, cause the one or more processors to perform the method according to claim 1.

7. The apparatus according to claim 6, wherein determining a faulted stack according to voltages or currents of the first stack and the second stack if the current pressure drop at the hydrogen side is higher than the control value corresponding to the current normal working condition comprises:
when the first stack and the second stack are coupled in series,
determining that the first stack has a water flooding tendency and is the faulted stack if a voltage of the first stack is decreased and a voltage of the second stack is increased, or determining that the second stack has a water flooding tendency and is the faulted stack if the voltage of the first stack is increased and the voltage of the second stack voltage is decreased,
or
when the first stack and the second stack are coupled in parallel,
determining that the first stack has a water flooding tendency and is the faulted stack if a current of the first stack is decreased and a current of the second stack is increased, or determining that the second stack has a water flooding tendency and is the faulted stack if the current of the first stack is increased and the current of the second stack is decreased.

8. The apparatus according to claim 6, wherein reducing an opening degree of a flow regulating valve of the faulted stack, and increasing an opening degree of a flow regulating valve of the other stack comprises:
controlling an opening degree of the first flow regulating valve to decrease and an opening degree of the second flow regulating valve to increase if the first stack has a water flooding tendency,
controlling the opening degree of the first flow regulating valve to increase and the opening degree of the second flow regulating valve to decrease if the second stack has a water flooding tendency.

9. The apparatus according to claim 8, wherein the method further comprises: restoring the opening degrees of the first flow regulating valve and the second flow regulating valve and keep monitoring continuously if the current pressure drop at the hydrogen side returns to below the control value corresponding to the current normal working condition.

10. The apparatus according to claim 9, wherein the pressure drop at the hydrogen side is calculated by a formula of $$\Delta P_{H_2\_theory}=$$

$$\begin{cases} \dfrac{6.32\times 10^{-11}(C_w+C_d)^2 LT^{1.6835}}{n(C_w\cdot C_d)^3(p-p_{sat})}(\lambda_{H_2}-0.5)I & (273K\le T\le 313K) \\ \dfrac{1.1748\times 10^{-9}(C_w+C_d)^2 Le^{T/275.7}T}{n(C_w\cdot C_d)^3(p-p_{sat})p^{0.0263}}(\lambda_{H_2}-0.5)I & (313K<T\le 373K) \end{cases},$$

where L is a channel length, e refers to e constant, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell, and I is a current of the fuel cell;

the control value of the hydrogen pressure drop is determined by a formula of $$\Delta P_{control}=\Delta P_{H_2\_theory}+\tfrac{1}{2}\Delta P_{ladder},$$

wherein the hydrogen pressure drop varies in the water flooding process as a two-step variation, and $\Delta P_{ladder}$ is determined as a difference in pressure drop between the two steps.

11. A non-transitory computer-readable storage medium having stored therein computer programs that, when executed by a processor of a terminal, causes the terminal to perform the method according to claim 1.

12. The computer-readable storage medium according to claim 11, wherein determining a faulted stack according to voltages or currents of the first stack and the second stack if the current pressure drop at the hydrogen side is higher than the control value corresponding to the current normal working condition comprises:
when the first stack and the second stack are coupled in series,
determining that the first stack has a water flooding tendency and is the faulted stack if a voltage of the first stack is decreased and a voltage of the second stack is increased, or determining that the second stack has a water flooding tendency and is the faulted stack if the voltage of the first stack is increased and the voltage of the second stack voltage is decreased,
or
when the first stack and the second stack are coupled in parallel,
determining that the first stack has a water flooding tendency and is the faulted stack if a current of the first stack is decreased and a current of the second stack is increased, or determining that the second stack has a water flooding tendency and is the faulted stack if the current of the first stack is increased and the current of the second stack is decreased.

13. The non-transitory computer-readable storage medium according to claim 11, wherein reducing an opening degree of a flow regulating valve of the faulted stack, and increasing an opening degree of a flow regulating valve of the other stack comprises:
   controlling an opening degree of the first flow regulating valve to decrease and an opening degree of the second flow regulating valve to increase if the first stack has a water flooding tendency,
   controlling the opening degree of the first flow regulating valve to increase and the opening degree of the second flow regulating valve to decrease if the second stack has a water flooding tendency.

14. The non-transitory computer-readable storage medium according to claim 13, wherein the method further includes:
   restoring the opening degrees of the first flow regulating valve and the second flow regulating valve and keeping monitoring continuously if the current pressure drop at the hydrogen side returns to below the control value corresponding to the current normal working condition.

15. The non-transitory computer-readable storage medium according to claim 14, wherein the pressure drop at the hydrogen side is calculated by a formula of $$\Delta P_{H_2\_theory} = \begin{cases} \dfrac{6.32 \times 10^{-11}(C_w + C_d)^2 L T^{1.6835}}{n(C_w \cdot C_d)^3 (p - p_{sat})}(\lambda_{H_2} - 0.5)I & (273K \le T \le 313K) \\ \dfrac{1.1748 \times 10^{-9}(C_w + C_d)^2 L e^{T/275.7} T}{n(C_w \cdot C_d)^3 (p - p_{sat}) p^{0.0263}}(\lambda_{H_2} - 0.5)I & (313K < T \le 373K) \end{cases},$$

where L is a channel length, e refers to e constant, n is a channel number at the hydrogen side, p is a hydrogen pressure, $\lambda_{H_2}$ is a stoichiometric ratio of hydrogen, T is an operating temperature of the fuel cell stack, $P_{sat}$ is a saturated vapor pressure at the temperature of T, $C_d$ is a channel depth at the hydrogen side of the fuel cell, and $C_w$ is a channel width at the hydrogen side of the fuel cell, and I is a current of the fuel cell;

the control value of the hydrogen pressure drop is determined by a formula of $$\Delta P_{control} = \Delta P_{H_2\_theory} + \tfrac{1}{2} \Delta P_{ladder},$$

wherein the hydrogen pressure drop varies in the water flooding process as a two-step variation, and $\Delta P_{ladder}$ is determined as a difference in pressure drops between the two steps.

* * * * *